United States Patent [19]

Koide et al.

[11] Patent Number: 4,617,441

[45] Date of Patent: Oct. 14, 1986

[54] TEMPERATURE CONTROLLED INDUCTION HEATING AND COOKING APPARATUS

[75] Inventors: Satoshi Koide, Osaka; Kiyoshi Hiejima, Shiga, both of

[73] Assignee: Sanyo Electric Co., Ltd., Osaka, Japan

[21] Appl. No.: 623,788

[22] Filed: Jun. 22, 1984

[30] Foreign Application Priority Data

Jul. 8, 1983 [JP] Japan .............................. 58-106963[U]
Nov. 17, 1983 [JP] Japan .............................. 58-178183[U]
Apr. 9, 1984 [JP] Japan .............................. 59-51556[U]

[51] Int. Cl.$^4$ ............................................... H05B 6/06
[52] U.S. Cl. ........................... 219/10.77; 219/10.49 R; 219/502; 340/596; 99/DIG. 14; 374/130; 374/155
[58] Field of Search ............ 219/10.77, 10.49 R, 219/10.67, 10.55 B, 10.55 R, 10.55 E, 502; 374/121, 130, 131, 149, 155; 99/DIG. 14, 421 TP; 340/584, 596

[56] References Cited

U.S. PATENT DOCUMENTS

| | | | |
|---|---|---|---|
| 3,742,174 | 6/1973 | Harnden, Jr. | 219/10.49 R |
| 3,742,175 | 6/1973 | Harnden, Jr. | 219/10.77 X |
| 3,781,504 | 12/1973 | Harnden, Jr. | 219/10.49 R |
| 4,088,863 | 5/1978 | Jellies | 219/10.55 E |
| 4,223,226 | 9/1980 | Quick et al. | 374/131 X |
| 4,402,790 | 9/1983 | Lynn et al. | 374/130 X |
| 4,532,396 | 7/1985 | Burack et al. | 219/10.49 R |

FOREIGN PATENT DOCUMENTS 58-53036 12/1983 Japan .

Primary Examiner—Philip H. Leung
Attorney, Agent, or Firm—Darby & Darby

[57] ABSTRACT

An induction heating cooking apparatus contains a cooker main unit (1), comprising a connector (17) attached to an operation part (7) of the cooker main unit (1) in a freely attachable/detachable manner. A probe (13) containing a thermistor therein is coupled to the connector (17). The probe (13) is inserted into the foodstuff to be cooked in a cooking pan (5), and the thermistor detects the temperature thereof. A light emitting device (23) installed in the connector (17) outputs a light signal in response to the output from the thermistor. This light signal is introduced into the cooker main unit (1) through a light transmitting part (25) formed at a bottom part (19) of the connector (17) and another light transmitting part (27) formed in the operation part (7), being received by a light receiving device (29). In response to the output from the light receiving device (29), a driving circuit drives an inverter. When no light signal is received, the inverter oscillates, and when the light signal is received, the inverter stops oscillating operation.

18 Claims, 16 Drawing Figures

TEMPERATURE CONTROLLED INDUCTION HEATING AND COOKING APPARATUS

BACKGROUND OF THE INVENTION

1. Field of the Invention

The present invention relates to an induction heating cooking apparatus. More specifically, the present invention relates to an induction heating apparatus capable of temperature control operation wherein the state of heating a foodstuff to be cooked in a cooking pan is controlled.

2. Description of the Prior Arts

The induction heating cooking apparatus, as is well known, generates a high frequency current by an inverter and produces a high frequency alternative magnetic field from a heating coil by this high frequency current. Above this heating coil, a cooking pan made of an iron group metal is closely disposed through a top plate composed of, for instance, ceramics or the like. This cooking pan is heated by a current induced by the high frequency alternating magnetic field. In such an induction heating cooking apparatus, the state of heating, that is, the power of inverter is controlled in response to the temperature of the foodstuff to be cooked in the cooking pan.

For instance, in Japanese Utility Model Publication Gazette No. 53036/1983 published for opposition on Dec. 2, 1983, an induction heating cooking apparatus is disclosed wherein a thermo-sensitive device is installed directly beneath the top plate, and thereby the temperature of the cooking pan is detected directly, in the prior art the temperature of the foodstuff can not be detected directly, and accordingly, this has a disadvantage of not-so-good precision.

Furthermore, in U.S. Pat. No. 3,742,174 patented on June 26, 1973 an induction heating cooking apparatus is disclosed wherein a thermistor and a light emitting diode which generates a light in response to the output of the thermistor are built-in at the bottom part of the cooking pan, and the light from the light emitting diode is detected in the cooker main unit through the top plate, and thereby the temperature operation is performed. In the induction heating cooking apparatus as disclosed in this prior patent, no ordinary cooking pan can be used, and also the top plate is required to be made of a light transmitting material. However, materials having a light transmitting property, heat resisting property and sufficient mechanical strength are expensive, and accordingly, the cooker itself becomes expensive.

Furthermore, in U.S. Pat. No. 3,742,175 patented on June 26, 1973, an induction heating cooking apparatus is disclosed which detects the temperature of a foodstuff to be cooked. using a temperature measuring probe, and the power can be controlled in response to the measured temperature. Use of the temperature measuring probe allows a direct detection of the temperature of the foodstuff to be cooked, therefore being more advantageous compared with the two prior arts as cited previously. However, in this prior art patent, an induction system is employed to transmit the signal outputted from the temperature measuring probe into the cooker main unit. As is described above in the induction heating cooking apparatus, however, a high frequency current, that is, a high frequency alternating magnetic field is produced, and therefore this magnetic field affects the transmitting path of the signal from the temperature measuring probe, and accordingly there is a possibility of misoperation.

SUMMARY OF THE INVENTION

A principal object of the present invention is to provide, therefore, an induction heating cooking apparatus which can correctly detect the temperature of a foodstuff to be cooked using a temperature measuring probe, and also has no possibility of misoperation.

In order to achieve the above-described object, in the present invention, transmission of the signal from the temperature measuring probe is carried out by utilizing an optical coupling by means of visible rays or non-visible rays. To be more detailed, a light transmitting part is formed at a portion of a cooker main unit, and a connector is attached in association with the light transmitting part in a freely attachable/detachable manner. An output of the thermo-sensitive device contained in the probe is converted into a light signal in the probe or in the connector, and this light signal is led into the cooker main unit through the above-mentioned light transmitting part, being received by a light receiving device. An inverter is controlled in response to the output of this light receiving device.

In accordance with the present invention, since the temperature of the foodstuff to be cooked is directly detected by the probe, a temperature operation of good precision can be performed. Furthermore, since the signal from the probe is converted into a light signal and the light signal is led into the cooker main unit, no transmission of the signal is affected by a high frequency current of the inverter or a high frequency alternating magnetic field. Also, since it is sufficient that the light transmitting part is formed at only a portion of the main unit, and it is unnecessary to form the whole top plate using the light transmitting material as shown in U.S. Pat. No. 3,742,174 as cited previously, and thus a top plate made of, for example, ordinary ceramics can be utilized. Consequently, a more economical induction heating cooking apparatus is obtainable.

In a preferred embodiment, a change-over which substantially enables or disables the light signal led into the cooker main unit is performed. In accordance with this preferred embodiment, a misoperation due to an extraneous light can be effectively prevented. When a cooker is so designed that the light signal can be enabled upon attaching the connector to the cooker main unit, the temperature operation can be automatically carried out to the cooker main unit, and therefore operation is very simple.

The above-mentioned object and other objects, features, aspects and advantages of the present invention will be more clarified from the following detailed description which is made in reference to the appended drawings.

BRIEF DESCRIPTION OF THE DRAWINGS.

FIG. 9 is a perspective view of a major part of a connector, and FIG. 10 is an illustrative cross-sectional view of a state wherein a connector is attached.

FIG. 14 is an illustrative cross-sectional view thereof, and FIG. 15 is a plan view thereof.

DETAILED DESCRIPTION OF THE PREFERRED EMBODIMENTS

Figure 1:
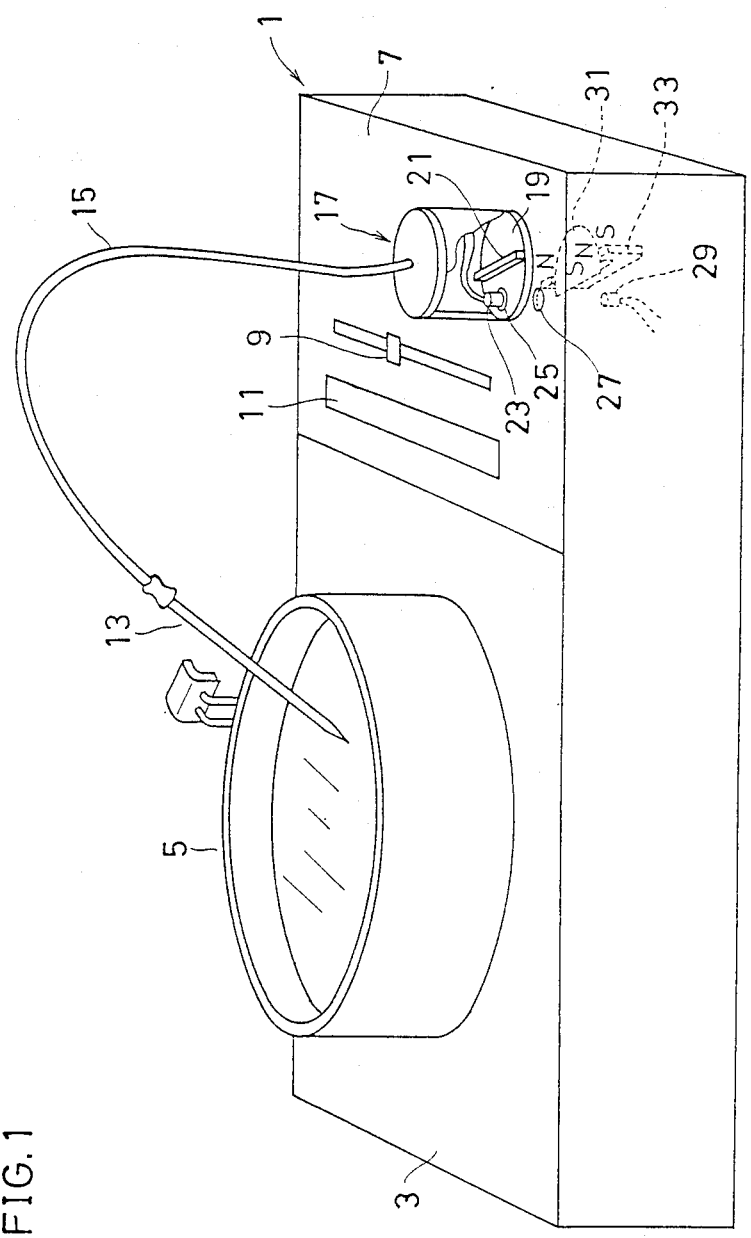
FIG. 1 is an entire perspective view showing one embodiment in accordance with the present invention.

FIG. 1 is an entire perspective view showing one embodiment in accordance with the present invention. An induction heating cooking apparatus contains a cooker main unit 1, and an inverter (FIG. 5) producing a high frequency current is installed therein. A top plate 3 is provided on the left side of the top surface of the cooker main unit 1, and an operation part 7 is formed on the right side thereof. The top plate 3 is composed of, for instance, a heat resisting insulating material such as ceramics and the like, and on the upper surface thereof a cooking pan 5 is placed. Furthermore, an induction coil (not illustrated) constituting a portion of the inverter and also producing a high frequency alternating magnetic field by means of a high frequeny current is installed directly beneath this top plate 3. Furthermore, the cooking pan 5 is, as is well known, composed of an iron group metal such as iron, 18-8 stainless steel or the like, and produces an induction current by undergoing the high frequency alternating magnetic field generated by the heating coil, heating a foodstuff therein to be cooked.

In the operation part 7, a power adjusting knob 9 for adjusting the power of the inverter and a display part 11 are installed. The power adjusting knob 9 is connected to a variable resistor, and the resistance value of the variable resistor is varied by moving the knob 9, and thereby the output power of the inverter, that is, the oscillation frequency of the inverter or the ratio of oscillation period to non-oscillation period of the inverter (duty ratio) is varied. The display part 11 displays a supplying state of the power supply to the inverter and a state of the output power, for example, strong or weak, of the inverter.

In a portion of the operation part 7, a light transmitting part 27 composed of a light transmitting material such as, for example, glass, acrylic resin or clear plastics are formed. This light transmitting part 27 may be a through hole. However, when such a through hole is used, not only there is a possibility that water, dust or the like enters the cooker main unit through this hole, but also there is a possiblity of an electric shock accident taking place through the hole, and therefore the light transmitting part 27 is preferably formed of a light transmitting material. Then, in relating with the light transmitting part 27, a connector 17 is attached on the operation part 7. This connector 17 can be freely attached to and detached from the operation part 7, that is the cooker main unit 1.

Figure 2:
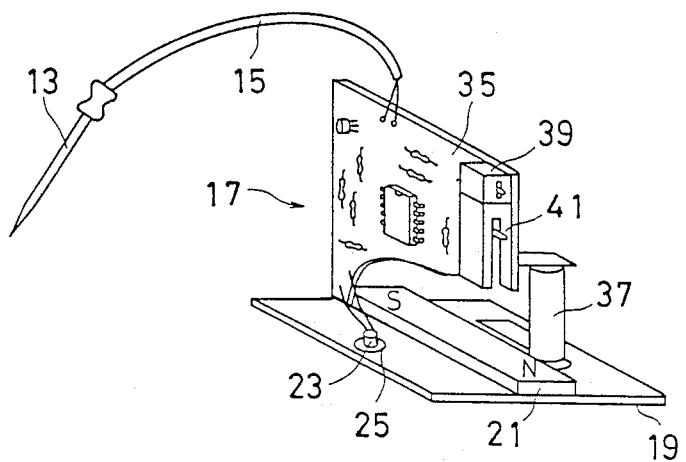
FIG. 2 is a schematic perspective view showing an inner structure of a connector.

Here description is made on the inner structure of the connector 17 in reference to FIG. 2. The connector 17 contains a bottom part 19. Its bottom part 19, top part as well as side part of the connector 17 are entirely composed of an opaque material. On the bottom part 19, a printed circuit board 35 for constituting an electric circuit of the connector 17 as described later is installed. A DC power supply such as a battery 37 is provided for the electric circuit constituted with this printed circuit board 35. Power to be supplied from the battery 37 to the printed circuit board 35, that is, the electric circuit is turned on or off by a switch 39. Furthermore, on the printed circuit board 35, a variable resistor 41 for setting the temperature is mounted. Respective operation parts of the switch 39 and the variable resistor 41, for instance, protrude outside from the side face of the connector 17, and accordingly an operator can manually operate the switch 39 and the variable resistor 41. A probe 13, that is, a thermo-sensitive device such as a thermistor or the like contained therein (not illustrated) is connected to the printed circuit board 35, that is, the electric circuit by means of a signal line 15, and a light emitting device 23 is also connected to the electric circuit.

A light transmitting part 25 is formed at a portion of the bottom part 19 of the connector 17. This light transmitting part 25 is formed at a position corresponding to the above-mentioned light transmitting part 27 formed in the operation part 7 in a state wherein the connector 17 is attached to the operation part 7. This light transmitting part 25 may be a through hole, but is preferably formed with a transparent material. In the vicinity of the light transmitting parts 25 in the connector 17, the light emitting device 23 such as, for example, a light emitting diode is installed. This light emitting device 23 may be either of the one generating visible rays and the one generating non-visible rays. And the light signal from the light emitting device 23 is led into the cooker main unit 1 through the light transmitting parts 25 and 27. On the other hand, and opto-electric transducer or a light receiving device 29 such as a photo transistor is installed in the cooker main unit 1 under the operation part 7. The light receiving surface of this light receiving device 29 is opposed to the light transmitting part 27. Accordingly, the light signal from the light emitting device 23 can be received by the light receiving device 29. In addition, no light transmitting part 25 is required to be partly formed when the entire bottom part 19 is constituted with a transparent material.

In the connector 17, a magnet 21 is further fixed on the bottom part 19. On the other hand, a shading plate 31 is installed in association with the light receiving device 29 in the cooker main unit 1. This shading plate 31 is composed of, for example, a disc-shaped magnetized iron plate which is partly notched or the like, being possible to be supported in rotation by a supporting shaft (not illustrated). And then, associated with the shading plate 31, a magnet 33 is installed in such a fashion that the periphery of the shading plate 31 is put between both poles thereof at opposite positions. Furthermore, the magnetic force of this magnet 33 is made weaker than that of the magnet 21 of the connector 17.

Accordingly, the shading plate 31 is affected by the magnet 21 rather than the magnet 33 in a state wherein the connector 17 is attached to the cooker main unit 1.

Figure 3:
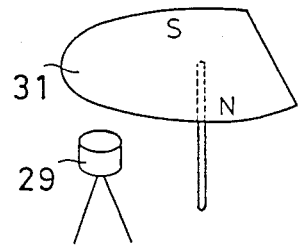
FIG. 3 and FIG. 4 are perspective views of a major part showing a relationship between a shading plate and a light receiving device.
Figure 4:
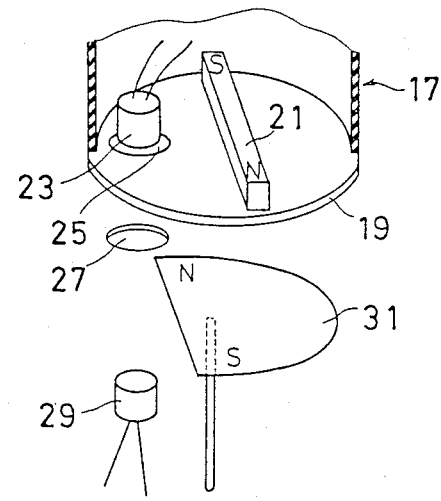

Hereupon, elucidation is made on the operation of the above-mentioned shading plate 31 in reference to FIG. 3 and FIG. 4. FIG. 3 shows a state wherein the connector 17 is removed from the cooker main unit 1. In this state, the shading plate 31 stands still in a state in FIG. 3 by the magnet 33 (FIG. 1) installed in association with it, and accordingly, the light receiving surface of the light receiving device 29 is shaded by this shading plate 31, and the light receiving device 29 produces no output at all. Thus, all the light for the light receiving device 29 are cut off in a state wherein the connector 17 is removed from the cooker main unit 1. When the connector 17 is attached to the cooker main unit 1 (FIG. 1), the magnet 21 of the connector 17 acts on the shading plate 31 is caused to stand still in a state as shown in FIG. 4 by the magnet 21 having a stronger magnetic force rather than by magnet 33 (FIG. 1). In this state, the notched part of the shading plate 31 is to be positioned above the light receiving surface of the light receiving device 29, and therefore the light receiving device 29 can receive the light signal outputted from the light emitting device 23 through the light transmitting parts 25 and 27. That is, change-over to the temperature operation mode can be made automatically only by attaching the connector 17 to the cooker main unit 1. In other words, the shading plate 31 and associated magnets 21 and 33 effect an action of enabling or disabling the light signal ouptutted from the light emitting device 23.

Figure 5:
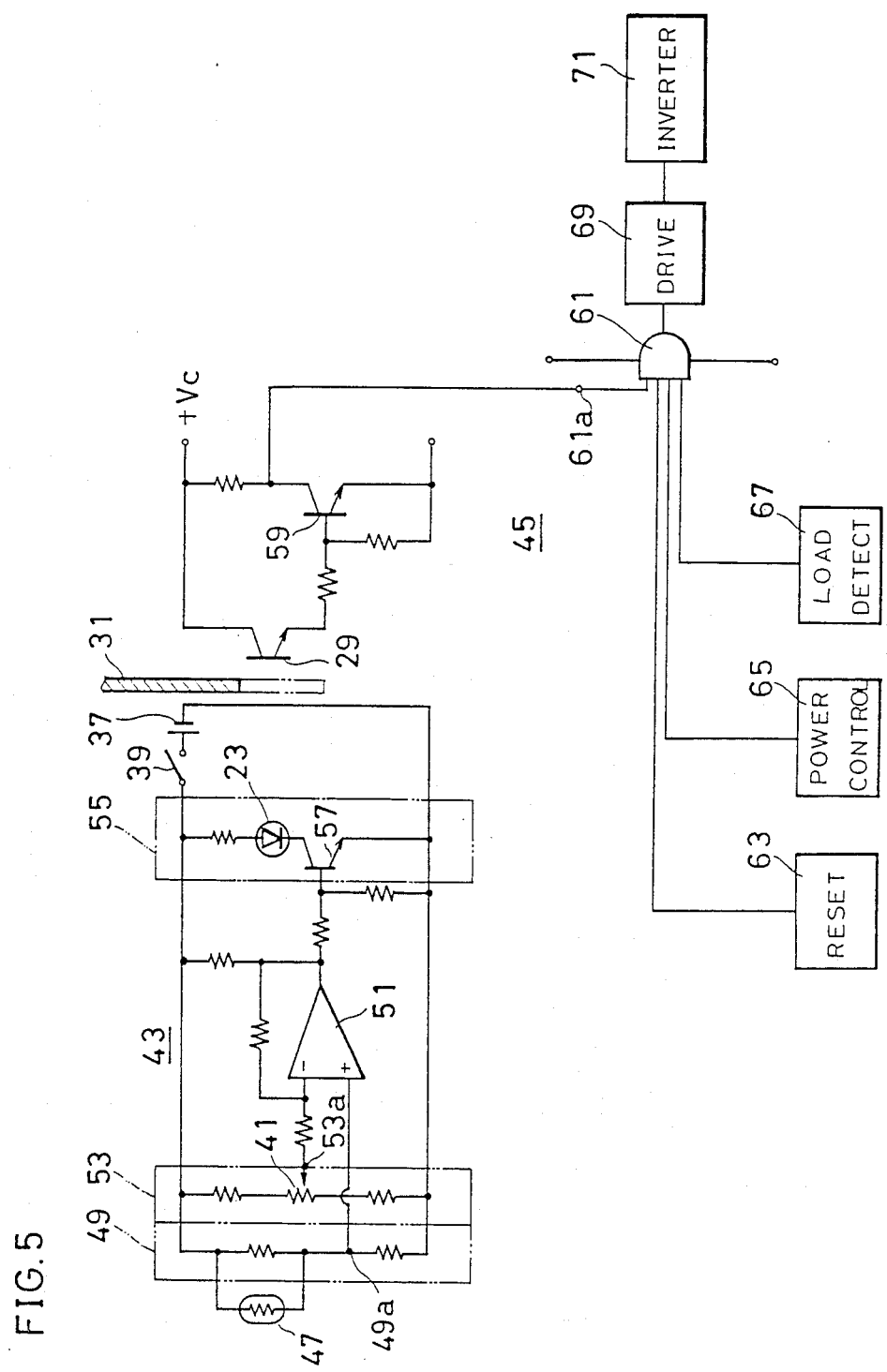
FIG. 5 is a circuit diagram showing one example of an electric circuit of the embodiment in FIG. 1.

FIG. 5 is a circuit diagram showing one example of the electric circuit. A circuit of light emitting side 43 is formed in the connector 17 (FIG. 1). The circuit of light emitting side 43 contains a thermistor 47 built-in at the tip of the probe 13, the light emitting device 23 and the like, and the circuit of light receiving side 45 contains the light receiving device 29.

In the circuit of light emitting side 43, the thermistor 47 constitutes a first potential divider circuit 49 in cooperation with the associated resistors. An output point 49a of this potential divider circuit 49 is connected to the (+) terminal of a comparator 51. On the other hand, the variable resistor 41 mounted on the printed circuit board 35 (FIG. 2) constituted a second potential divider circuit 53 in cooperation with other associated resistors. An output point 53a of this second potential divider circuit 53 is connected to the (−) terminal of the comparator 51 through an appropriate resistor. An output of the comparator 51 becomes the low level when the voltage of the (−) terminal is greater than that of the (+) terminal, and becomes the high level in the other case, the output being connected to the base of a transistor 57 contained in a driving circuit 55 for the light emitting device 23. In this driving circuit 55, the light emitting device 23 is provided between the collector of the transistor 57 and the power supply, namely the battery 37. In addition, the power switch 39 is connected between the battery 37 and the above-mentioned circuits 49, 51, 53 and 55.

On the other hand, the light receiving device or optoelectric transducer, for instance, the photo transistor 29 contained in the circuit of light receiving side 45 is connected to the power supply +Vc, and the emitter of this photo transistor 29 is connected to the base of a transistor 59. The output of the collector of this transistor 59 is connected to one input 61a and an AND circuit 61. Outputs from a reset circuit 63, a power control circuit 65 and a load detecting circuit 67 are given to the remaining inputs of the AND circuit 61, respectively. For these circuits 63, 65 and 67, the circuits 29, 28 and 26 of FIG. 2B in U.S. Pat. No. 4,352,000 assigned to the same assignee as the one to the present invention patented on Sept. 28, 1982 can be utilized, respectively. Accordingly, here, detailed description on these circuits 63, 65 and 67 is omitted.

The output of the AND circuit 61 is given to an inverter driving circuit 69, and the inverter driving circuit 69 drives an inverter 71 in response to the output and the AND circuit 61. In addition, containing the induction coil (not illustrated) in this inverter 71 is as described above. Futhermore, these circuits 69 and 71 can also utilize the structure as disclosed in U.S. Pat. No. 4,352,000 previously cited. For example, the inverter driving circuit 69 is equivalent to the circuit 16 in FIG. 2A in U.S. Pat. No. 4,352,000, and the inverter 71 is equivalent to the circuit 15 in the same patent. Accordingly, detailed description on these circuits 69 and 71 is also omitted.

In operation, first, a case is assumed where the connector 17 is not attached to the cooker main unit 1. In this case, as is described above, the shading plate 31 becomes a state as shown in FIG. 3, and thereby the light receiving surface of the light receiving device 29 is shaded. Accordingly, in this state, the circuit of light emitting side 43 has no effect upon the operation of the cooker at all. That is, since the light receiving device 29 is shaded by the shading plate 31, this light receiving device 29 is nonconductive, and therefore the transistor 59 is kept an off state. Consequently, the voltage of the high level of the power supply +Vc is developed on the output of this transistor 59, and the voltage of the high level is inputted to the input 61a of the AND circuit 61. On the other hand, the reset circuit 63 ouputs the voltage of the low level when the power supply is turned off and imemdiately after the power supply is turned on, but normally outputting the voltage of the high level. Furthermore, the load detecting circuit 67 outputs the voltage of the low level when a load to be used, that is, an article placed on the top plate 3 (FIG. 1) is inappropriate thing or a small load such as a spoon or the like, but normally outputting the voltage of the high level. The power control circuit 65 outputs clock pulses of 20–40 kHz, and the duty ratio of the high level to the low level of the clock pulses is set appropriately. That is, the power control circuit 65 contains a variable resistor (not illustrated) connected to the above-mentioned power adjusting knob 9, and accordingly, by setting the power adjusting knob 9 to an appropriate position, the duty ratio of the clock pulses from this circuit 65, that is, the output of the inverter 71 can be adjusted. And then, the clock pulses from the power control circuit 65 are outputted intact from the AND circuit 61 and the inverter 71 performs oscillating operation responding to the clock pulses.

Next, description is made on a case where the connector 17 is attached to the cooker main unit 1. In this case, as is described above, the shading plate 31 is rotated by an action of the magnet 21, and thereby a light path is opened between the light emitting device 23 and the light receiving device 29 as shown in FIG. 4. In order to set the desired temperature in this state, the input voltage from the potential divider circuit 53 to the (−) terminal of the comparator 51 is set by operating the variable resistor 41. Then, the tip of the probe 13 is inserted into the foodstuff to be cooked in the cooking pan 5 (FIG. 7) on the top plate 3. Therefore, the operation of the inverter 71 is started. In the early state, the temperature of the foodstuff to be cooked is low, and the output voltage of the second potential divider circuit 53 inputted to the (−) terminal of the comparator 51 is higher than the output voltage of the first potential divider circuit 49 inputted to the (+) terminal thereof. Consequently, the output of the comparator 51 becomes the low level, and the transistor 57 remains intact in the off state and light emitting device 23 is not driven. Accordingly, the light receiving device 29 remains intact in the off state and the voltage of the low level is applied to the base of the transistor 59. Therefore, this transistor 59 remains intact in the off state, and the collector thereof, that is, the input 61a of the AND circuit 61 becomes the high level. Consequently, the inverter 71 continues the normal oscillating operation.

When the temperature of the foodstuff to be cooked rises, the resistance value of the thermistor 47 is decreased, and the output voltage of the first potential divider circuit 49 rises. When the output voltage of the first porential divider circuit 49 becomes higher than the output voltage of the second potential divider circuit 53, that is, when the temperature of the foodstuff to be cooked becomes higher than the set temperature, the output of the comparator 51 become the high level. In response to this, the transistor 57 is turned on, and the light emitting device 23 is driven.

Consequently, the light signal is outputted, and the light signal from the light emitting device 23 is given to the light receiving device 29 through the light transmitting parts 25 and 27 (FIG. 1), and accordingly the light receiving device 29 becomes an on state, and in response to this the transistor 59 becomes an on state and the input 61a of the AND circuit 61 becomes the low level. In response to this, clock pulses from the power control circuit 65 are blocked by the gate circuit 61, and oscillation of the inverter 71 is stopped. In such a state wherein oscillating operation of the inverter 71 is stopped, the temperature of the foodstuff to be cooked is decreased and the resistance value of the thermistor 57 is increased, again. And then, when the voltage of the (+) terminal of the comparator 51 becomes lower again than the voltage of the (−) terminal, the comparator 51 outputs the voltage of the low level again. Accordingly, the transistor 57 becomes the off state, and no light signal is outputted from the light emitting device 23. Accordingly, the oscillating operation of the inverter 71 is restarted. Thus, the temperature of the foodstuff to be cooked can be kept constant.

From the above-mentioned description, it will be understood that the temperature of the foodstuff to be cooked can be arbitrarily set by operating the variable resistor 41 to adjust the voltage to the (−) terminal of the comparator 51.

Furthermore, in the above-mentioned embodiment, such a configuration is adopted wherein upon attaching the connector 17 to the cooker main unit 1, the temperature operation immediately starts. However, for example, the configuration may be such that a photo interrupter is installed in the vicinity of the light receiving device (not illustrated) so as to pinch the shading plate 31 (FIG. 1), and attachment of the probe is detected by this photo interrupter, and the temperature operation is made possible responding to the detection of this attachment of the probe. Then, even if an extraneous light impinges on the light receiving device 29, a misoperation due to the extraneous light can be prevented effectively.

Figure 6:
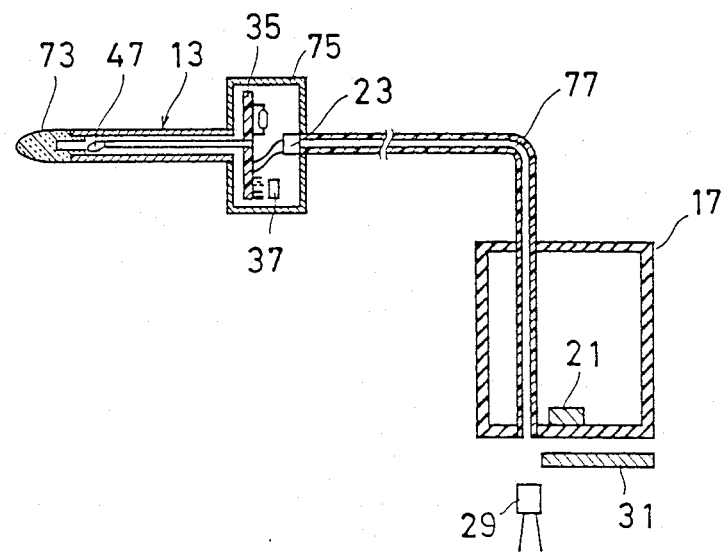
FIG. 6 is an illustrative cross-sectional view showing another example of a temperature measuring probe.

FIG. 6 is a cross-sectional view showing another example of the temperature measuring probe, and in this figure, the same reference numbers are given for parts same as or similar to the parts in FIG. 1. On the tip part of the probe 13, a protector 73 composed of an insulating material such as, for instance, ceramics is installed. This protector 73 is intended to prevent the probe 13 from detecting the temperature of the bottom part of the cooking pan when the tip part of the probe 13 is brought in contact with the bottom part of the cooking pan 5 (FIG. 1). Then, a housing 75 is formed at the rear end of the probe 13, and the printed circuit board 35 is housed in this housing 75. This printed circuit board 35, likewise the previous embodiment in FIG. 2, constitutes a necessary electric circuit. That is, the thermistor 47 and also the light emitting device 23 are connected to the printed circuit board 35. A light transmitting path 77 such as an optical fiber extends from the housing 75, and the light signal from the light emitting device 23 impinges on one end of this light transmitting path 77, and the other end is brought to the light transmitting part 25 formed at the bottom part 19 of the connector 17. That is, in this embodiment in FIG. 6, a configuration is adopted wherein the light signal is led to the light transmitting part 25 using the light transmitting path 77 in response to the output of the thermistor 47. And, it is the same as the above-mentioned embodiment that the light signal is given to the light receiving device 29 through this light transmitting part 25.

Figure 7:
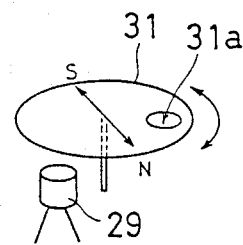
FIG. 7 and FIG. 8 are perspective views of a major part showing relationships between a shading plate and a light receiving device when another type of shading plate is used.
Figure 8:
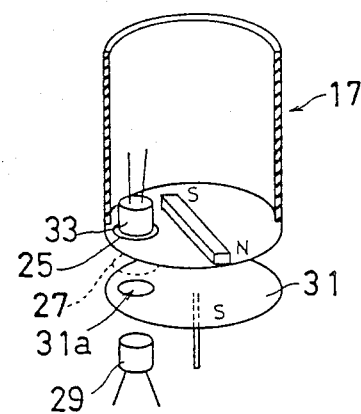

FIG. 7 and FIG. 8 are views showing another example of the shading plate. In the present embodiment, a through hole 31a is formed on the shading plate 31. When this through hole 31a is located at the position as shown in FIG. 7, incoming of the light signal to the light receiving device 29 or an extraneous light is cut off. In inverse, when the through hole 31a is located on the light receiving surface of the light receiving device 29, the light signal from the light emitting device 23 is given to the light receiving device 29 through the light transmitting parts 25 and 27 and the through hole 31a. By adopting such a configuration that the through hole 31a is installed on the shading plate 31, the possibility of detecting an extra light other than the light signal from the light emitting device 23 at the light receiving device 29 will become small.

Figure 9:
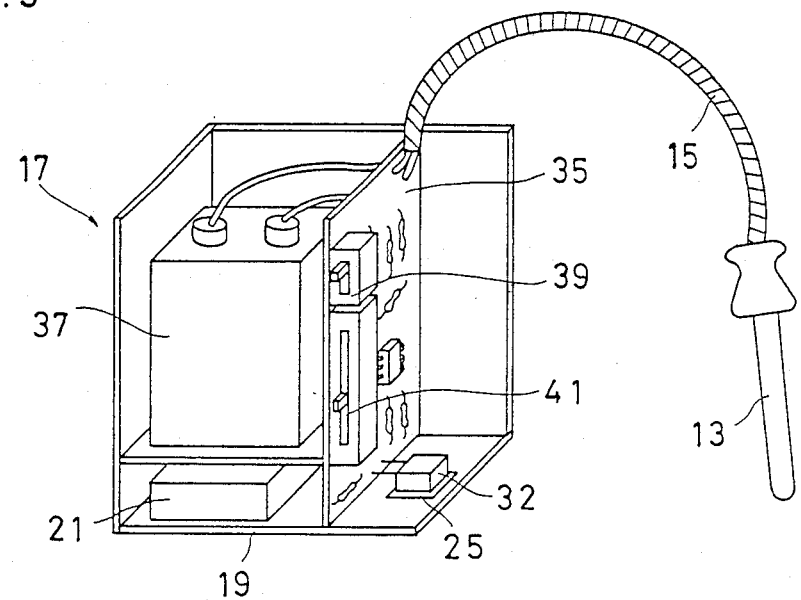
FIG. 9 and FIG. 10 show another embodiment of a mechanism for enabling or disabling a light signal.
Figure 10:
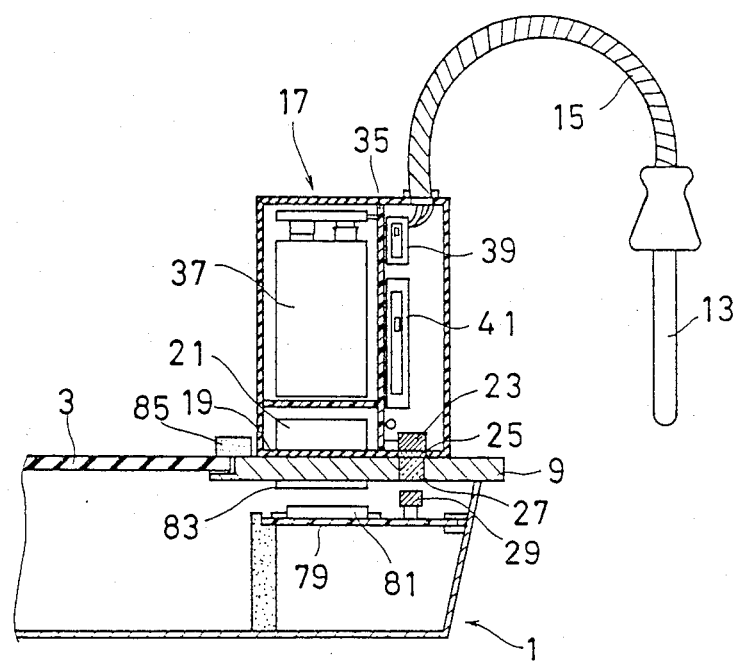

FIG. 9 shows another example of the connector, and FIG. 10 is an illustrative cross-sectional view showing a state wherein the connector is attached to the cooker main unit. The connector 17 as shown in FIG. 9 is basically the same as the previous one as shown in FIG. 2. Accordingly, here, the same reference symbols are given to the same or similar parts, and thereby a duplicate description is omitted. The present embodiment is intended to substantially enable or disable the light signal by using a switching means such as a reed switch rather than the shading plate 31 (FIG. 1).

A printed circuit board 79 is installed in nearly parallel with the operation part 7 in the cooker main unit 1 under the operation part 7 whereto the connector 17 is attached. On this printed circuit board 79, the light receiving device 29 is mounted so as to oppose the light emitting device 23 through the light transmitting parts 25 and 27. Furthermore, a reed switch 81 is mounted on the printed circuit board 79. This reed switch 81 is mounted on the position opposing the magnet 21 contained in the connector 17 in a state wherein the connector 17 is attached to the operation part 7. And a magnet 83 is mounted on the rear-surface of the operation part 7 so as to lie between the magnet 21 and the reed switch 81. The magnetic force of this magnet 83 is set weaker than that of the magnet 21, and therefore the reed switch 81 is affected by the magnet 21 in a state wherein the connector 17 is attached to the operation parts 7.

In a state wherein connector 17 is not attached, the reed switch 81 is turned off by an action of the magnet 83. This reed switch 81, as is described later, acts as a means for changing over the temperature operation mode and the normal operation mode. And in the off state of the reed switch 81, the cooker is to operate in the normal operation mode. When the connector 17 is attached to the operation part 7, a magnetic circuit is constituted with the magnets 21 and 83, and consequently an effect of magnetic force of a magnet 83 on the reed switch 81 is lost. Consequently, the reed switch 81 is restored to an on state. By such turning on of the reed switch 81, the cooker is moved to the temperature operation. On the action of this reed switch 81, description is made later in reference to FIG. 11.

A partition 85 composed of, for example, an insulating material is mounted on the joint part of the operation part 7 and the top plate 3 as shown in FIG. 10, and a stepped part is formed with the operation part 7 and the partition 85. By this stepped part, the positioning is accomplished so that the light transmitting part 25 of the connector 17 will correspond to the light transmitting part 27 of the operation part 7. That is, in attaching the connector 17 to the operation part 7, the side face of the bottom part of the connector 17 has only to be brought in contact with the side face of the partition 85.

Furthermore, the above-mentioned magnet 83 effects not only the action of change-over of on and off of the reed switch 81, but also the function of holding the connector 17 on the operation part 7 in a fixed fashion. That is, when the connector 17 is positioned and attached to the operation part 7 as described above, the magnet 21 of the connector 17 and the magnet 83 of the operation part 7 attract each other, and thereby the connector 17 is fixed to the operation part 7. In addition, such magnet 83 may be replaced by a plate made of ferromagnetic substance or the like.

Figure 11:
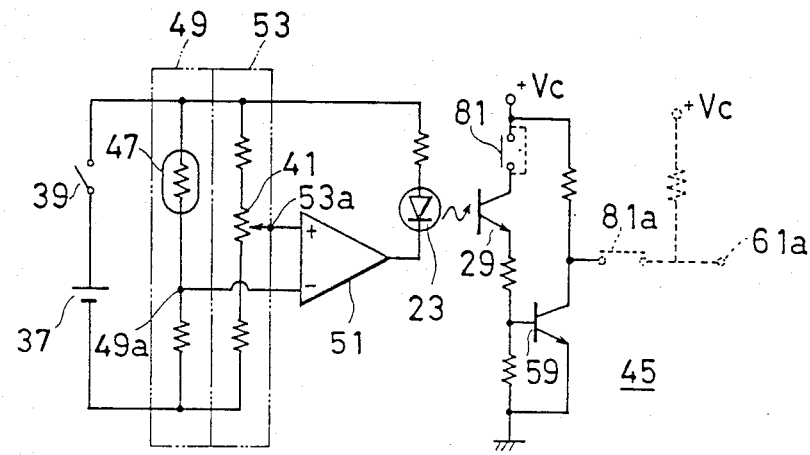
FIG. 11 is a circuit diagram of a major part showing another example of an electric circuit.

FIG. 11 shows a converter circuit for changing-over the mode by using the reed switch 81. The circuit of light emitting side 43 is nearly the same as that of the embodiment in FIG. 5, and here the description thereon is omitted. On the other hand, in the circuit of light receiving side 45, the reed switch 81 is inserted between the light receiving device 29 and the power supply +Vc.

In operation, when connector 17 is not attached, the reed switch 81 is in an off state as described above. When the reed switch 81 remains in the off state, the light receiving device 29 can not be renderred a conductive state. Accordingly, incoming of any light on the light receiving surface of the light receiving device 29 does not turn the transistor 59 to on in that state. Consequently, the voltage of the high level is kept applied intact to the collector of this transistor 59, that is, the input 61a of the AND circuit. Accordingly, the inverter 71 (FIG. 5) is set to the normal operation mode.

When the connector 17 is attached to the operation part 7, the reed switch 81 is turned on. Accordingly, the light signal from the light emitting device 23 to the light receiving device 29 is enabled. That is, when the temperature of the foodstuff is to be cooked is lower than the set temperature, the voltage at the output point 49a of the first potential divider circuit 49 is lower than the voltage at the output point 53a of the second potential divider circuit 53, and therefore, the comparator 51 outputs the voltage of the high level. Consequently, the light emitting device 23 is not driven, and no light signal from this light emitting device 23 is outputted. Accordingly, the voltage of the high level is applied to the output of the transistor 59, that is, the input 61a of the AND circuit, and thereby the inverter 71 (FIG. 5) continues the oscillating operation.

When the temperature of the foodstuff to be cooked becomes high, the output of the comparator 51 is turned to the low level, and the light emitting device 23 is driven to output the light signal therefrom. The light signal reaches the light receiving device 29. Since the reed switch 81 is turned on, when the light receiving device 29 receives the light signal, this light receiving device 29 conducts a current, and the transistor 59 is turned on. Consequently, the terminal 61a is turned to the low level and the inverter stops the oscillating operation. Then, when the temperature of the foodstuff to be cooked falls again, the terminal 61a is turned to the high level again by the light signal from the light emitting device 23, and thereby the inverter 71 (FIG. 5) restarts the oscillating operation, and consequently the temperature of the foodstuff to be cooked is kept constant.

In FIG. 11, the reed switch 81 is inserted between the light receiving device 29 and the power supply +Vc. However, this reed switch 81 may be inserted between the collector of the transistor 59 and the input terminal 61a of the AND circuit 61 (FIG. 5) as shown by the dotted line in FIG. 11. In this case, the power supply +Vc and the light receiving device 29 are directly connected as shown by the dotted line and the terminal 61a is connected to the power supply +Vc through a resistor. Then, when the connector 17 is attached, the reed switch 81 is turned on. Accordingly, the potential of the terminal 61a is varied depending upon the state of the transistor 59, that is, the state of the light receiving device 29. In inverse, when the connector 17 is removed, the reed switch 81 is turned off, and the terminal 61a remains intact at the high level independent of the state of the light receiving device 29. Accordingly the inverter 71 (FIG. 5) can make the oscillating operation in the normal operation mode.

Furthermore, the above-mentioned reed switch 81 (81a), needless to say, may be replaced by a switch capable of manual operation.

Figure 12:
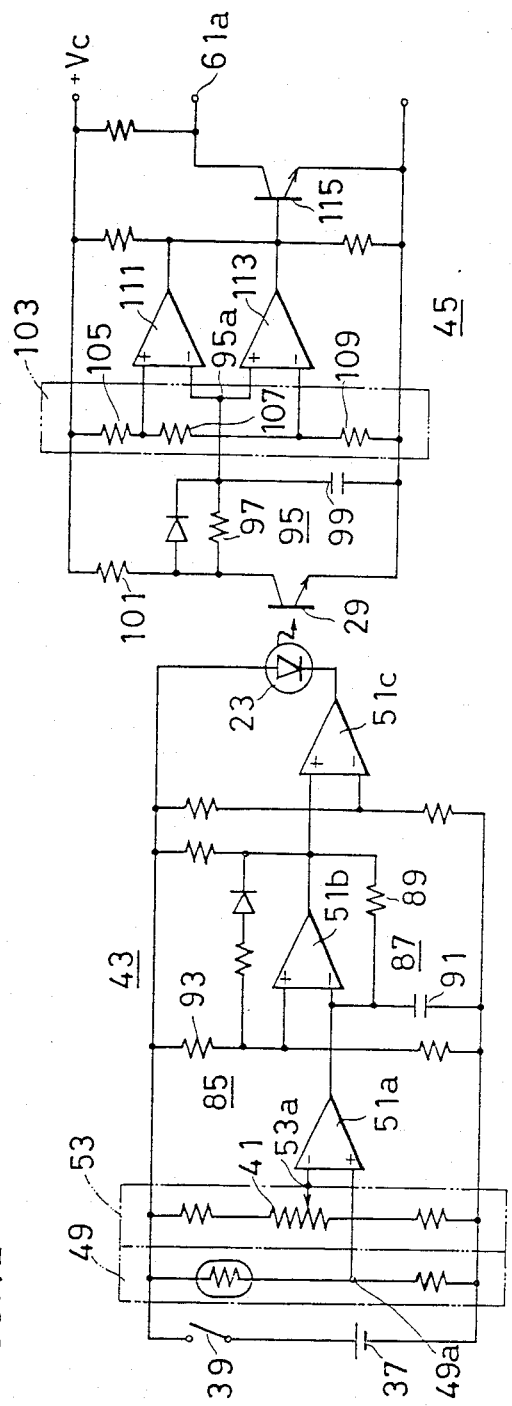
FIG. 12 is a circuit diagram of a major part showing still another example of an electric circuit.

FIG. 12 is a circuit diagram showing another embodiment of the electric circuit. In the present embodiment, the light signal is enabled or disabled without using a switching means such as the shading plate or the reed switch.

The circuit of light emitting side 43, likewise the previous embodiment, contains the first potential divider circuit 49 constituted with the thermistor 47 contained and the second potential divider circuit 53 constituted with the variable resistor 41 contained. And, the output point 49a of the first potential divider circuit 49 and the output point 53a of the second potential divider circuit 53 are inputted into a comparator circuit 85. The comparator circuit 85 contains three comparators 51a, 51b and 51c, and the output points 49a and 53a are connected to the (+) terminal and the (−) terminal of the comparator 51a respectively, and the output of the comparator 51a is connected to the (−) terminal of the next stage comparator 51b. An RC circuit 87 composed of a resistor 89 and a capacitor 91 is connected to the (−) terminal of this comparator 51b, and the output point of the potential divider circuit containing a resistor 93 is connected to the (+) terminal of the comparator 51b. The output of the comparator 51b is connected to the (+) terminal of the final stage comparator 51c and a reference voltage from the potential divider circuit is applied to the (−) terminal of this comparator 51c. Then, the output of the comparator 51c is connected so as to be able to drive the light emitting device 23. In the present embodiment, a light emitting device 23 is not driven until the temperature of the foodstuff to be cooked reaches the set temperature, and when it reaches the set temperature the light emitting device 23 emits a light intermittently, that is, in a pulse fashion.

Figure 13:
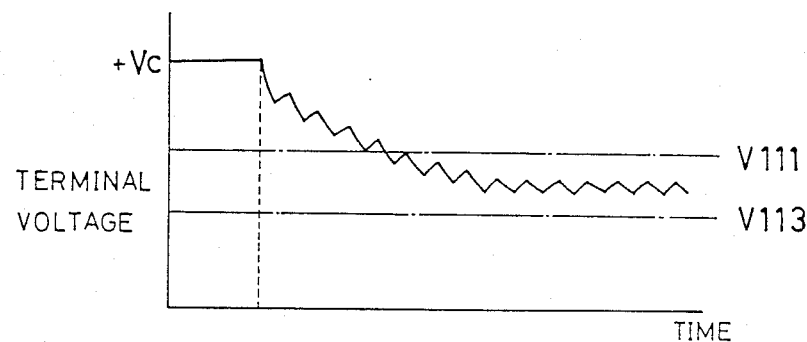
FIG. 13 is a graph for explaining operation in FIG. 12.

In the circuit of light receiving side 45, and RC circuit 95 composed of a resistor 97, a capacitor 99 and so on is connected to the light receiving device 29, and a resistor 101 is connected between the light receiving device 29 and the power supply +Vc. The output voltage of the RC circuit 95, that is, the terminal voltage of the capacitor 99 is applied to the (−) terminal of a comparator 111 and the (+) terminal of a comparator 111 in common. A reference voltage from a potential divider circuit 103 is applied to remaining terminals of the comparators 111 and 113. That is, a point of connection of resistors 105 and 109 constituting the potential divider circuit 103 is connected to the (+) terminal of the comparator 111, and a point of connection of a resistor 107 and the resistor 109 is connected to the (−) terminal of the comparator 113. The outputs of these comparator 111 and 113 are connected to the base of a transistor 115 in common. This transistor 115 is equivalent to the transistor 59 in the previous embodiment (FIG. 5 and FIG. 11). And then, the collector of this transistor 115 is connected to the power supply +Vc through a pull-up resistor, and also connected to the input terminal 61a of the AND circuit 61 (FIG. 5). Furthermore, respective threshold voltages V111 and V113 of the comparator 111 and 113 are set to different levels as shown in FIG. 13. Then, to be brief, when the voltage of a terminal 95a of the RC circuit 95 is between two threshold values thereof V111 and V113, operation is made so as to stop the oscillation of the inverter 71 (FIG. 5).

In operation, when the temperature of the foodstuff to be cooked is lower than the set temperature, the output of the comparator 51a is turned to the low level, and the output of the comparator 51b is fixed at the high level, and therefore, the output of the comparator 51c remains at the high level, and light emitting device 23 is not driven. That is, in this case, no light signal from the light emitting device 23 is outputted. On the other hand, in the circuit of light receiving side 45, the light receiving device 29 becomes the off state since no light signal impinges on it. Accordingly, the terminal voltage of the RC circuit 95 becomes approximately +Vc as shown in FIG. 13. Consequently, the output of the comparator 111 is turned to the low level, and accordingly the input terminal 61a is turned to the high level. Thus, the inverter 71 (FIG. 5) can perform the normal oscillating operation.

When the temperature of foodstuff to be cooked rises above the set temperature, the output of the comparator 51a becomes the high level, that is, an open state, and the output of the comparator 51b causes a pulse oscillation at a frequency determined nearly by the RC circuit 87. Accordingly, in this state, the light emitting device 23 repeats on and off at this period. On the other hand, in the circuit of light receiving side 45, the light receiving device 29 receives the pulsive light from the light emitting device 23. When the light emitting device 23 emits a light and a light signal is given to the light receiving device 29, the RC circuit 95 is discharged through the light receiving device 29 of conductive state, and inversely, when light receiving device 29 does not receive the light signal, the RC circuit 95 is charged through the resistor 101. When the light receiving device 29 is turned on, the terminal voltage of the capacitor 99 contained in the RC circuit 95 becomes merely 0 V, and the output of the comparator 113 becomes the low level. In response to this, the transistor 115 turned off, and the input terminal 61a becomes the high level, and thereby the inverter 71 can perform the normal oscillating operation. Furthermore, when the light receiving device 29 is in the off state, the terminal voltage of the RC circuit 95 becomes approximately +Vc, and the output of the comparator 111 becomes the low level. Accordingly, the transistor 115 remains in the off state, and the input terminal 61a becomes the high level and thereby the inverter can perform the normal oscillating operation.

If the time constant of the RC circuit 87 is so set that the light emitting device 23 repeats on and off with the duty ratio of one to one when the temperature of the foodstuff to be cooked which is detected by the thermistor 47 exceeds the set temperature, the voltage of the terminal 95a of the RC circuit 95 stays at a value about one-half of the voltage +Vc as shown in FIG. 13. Note that in this case the resistance values of the resistors 97 and 101 are assumed to be equal. Furthermore, when respective resistors 105, 107 and 109 of the potential divider circuit 103 are assumed to have equal resistance values and when the voltage of the terminal 95a is nearly equal to Vc/2, the outputs of the comparators 111 and 113 become the high level. Accordingly, the transistor 115 is turned on, and the voltage of the input terminal 61a becomes the low level, and thereby the oscillating operation of the inverter 71 (FIG. 5) is stopped. And then, when the temperature of the foodstuff to be cooked falls and the resistance value of the thermistor 47 becomes high, the light emitting device 23 does not emit a light and the light receiving device 29 turned off. At this time, if the voltage of the terminal 99a is out of the range between the threshold voltages V111 and V113, as is described above, either of the outputs of the comparators 111 and 113 becomes the low level, and therefore the transistor 115 is turned off. In this state, the input terminal 61a becomes the high level, and the inverter resumes the oscillating operation. Thus, the temperature operation is carried out.

If the connector 17 is not attached, an extraneous light impinges on the light receiving device 29. Accordingly, this light receiving device 29 continues to stay in the on state. Consequently, the capacitor 99 contained in the RC circuit 95 is discharged, and the terminal voltage of the RC circuit 95 becomes approximately 0 V, and the output of the comparator 113 becomes the low level. In response to this, the transistor 115 is turned off, and the input terminal 61a is turned to the high level, and thereby the inverter 71 can perform the normal oscillating operation.

Furthermore, for instance, when the light transmitting part 27 (FIG. 1) is blocked with something and thereby no light impinges on the light receiving device 29 at all, the light receiving device 29 becomes the off state. Accordingly, the capacitor 97 is charged, the terminal voltage of the RC circuit 95 becomes approximately +Vc, and the output of the comparator 111 becomes the low level. Accordingly, the input terminal 61a becomes the high level, and thereby the inverter can perform the normal oscillating operation.

Figure 14:
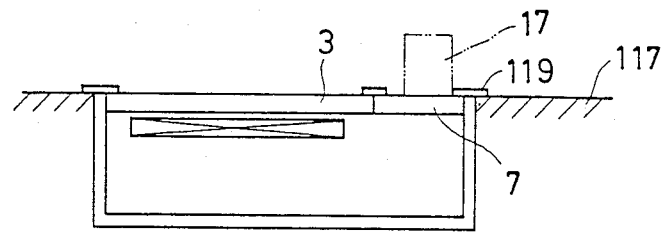
FIG. 14 and FIG. 15 show one example of a mechanism for positioning a connector.
Figure 15:
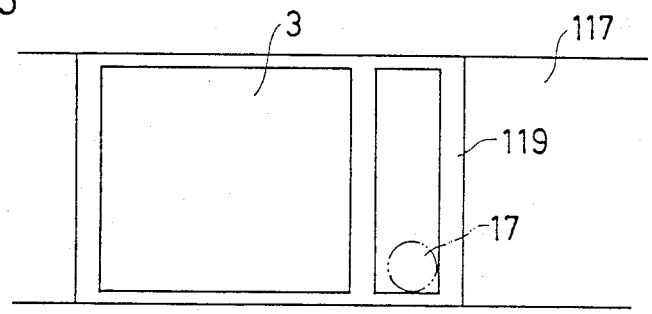

FIG. 14 and FIG. 15 is an illustrative view showing one example of the mechanism for positioning the connector. In the present embodiment, the cooker is imbedded into a kitchen counter 117, and a frame 119 is mounted corresponding to the periphery of the cooker main unit. Accordingly, when the connector 17 is attached to the operation part 7, positioning of the connector 17 can be accomplished only by bringing the side face of the connector 17 in contact with the inside of the corner of the frame 119.

Figure 16:
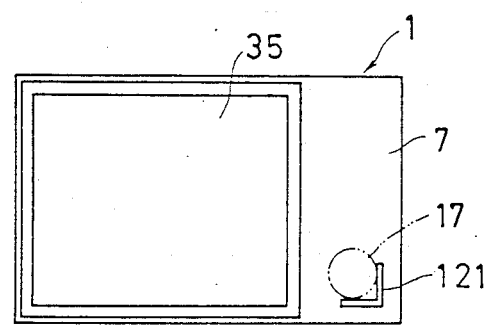
FIG. 16 is a plan view showing another example of a mechanism for positioning a connector.

FIG. 16 shows one example of the positioning mechanism in the case where an induction heating cooking apparatus is constituted in a single unit. In the present embodiment, a L-shaped rib 121 is formed on the operation part 7 of the cooker main unit. And then, when the connector 17 is attached, positioning of the connector 17 can be accomplished only by bringing the side face thereof in contact with this rib 121.

Furthermore, in the above-mentioned embodiment, the magnets 21 and 83 (FIG. 10) are utilized to hold the connector 17 in a fixed fashion. However, other arbitrary configurations can be adopted for such a holding means. For example, it can be considered that a rib or the like which protrudes outward from the side face of the connector is formed beforehand, and a hook or the like is installed on the cooker main unit so as to be able to engage this rib, and the connector is positioned to the cooker main unit, and thereafter the rib is engaged by the hook.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An induction heating cooking apparatus, comprising:
   a first power supply for supplying DC voltage,
   an inverter which contains an induction coil and is energized by said first power supply,
   a cooker main unit for housing said induction coil therein,
   a light transmitting part formed in a portion of said cooker main unit,
   a connector attached to said cooker main unit in a freely attachable/detachable manner,
   a probe containing a thermo-sensitive device and being connected to said connector,
   a light emitting device being installed in said connector of said probe for emitting a light signal in response to an output of said thermo-sensitive device, the light signal from said light emitting device being led into said cooker main unit through said light transmitting part,
   a light receiving device being installed in said cooker main unit for receiving said light signal,
   control means for controlling said inverter in response to an output of said light receiving device, and
   change over means responsive to (1) the attachment of said connector to said cooker main unit for permitting light to travel through said light transmitting part, and to (2) the detachment of said connector from said cooker main unit for blocking light from traveling through said light transmitting part to said light receiving device.

2. An induction heating cooking apparatus in accordance with claim 1, wherein said change-over means comprises:
   magnet means installed in said connector, and
   a magneto-sensitive member being installed at a side of said cooker main unit
   for responding to (1) said magnet means being proximate thereto for permitting light to travel through said light transmitting part, and to (2) the removal of said connector and magnet from said cooker main unit for blocking the travel of light through said light transmitting part.

3. An induction heating cooking apparatus in accordance with claim 2, wherein said magneto-sensitive member comprises a magneto-sensitive switch being turned on or off in response to said magnet means, and the output of said light receiving device is enabled or disabled by said magneto-sensitive switch.

4. An induction heating cooking apparatus in accordance with claim 2, wherein said magneto-sensitive member comprises shading plate means being installed between said light emitting device and said light receiving device and capable of providing a specific state in response to said magnet means, and
   said light signal from said light emitting device can reach said light receiving device when said shading plate means is in said specific state.

5. An induction heating cooking apparatus in accordance with claim 1, wherein
   said light emitting device outputs a pulsed light as said light signal,
   said light receiving device comprises a photo conductive element which conducts a current by receiving said light signal,
   said change-over means comprises;
   an RC circuit being charged or discharged in response to a state of said photo conductive element, and
   level discriminator means for discriminating the terminal voltage of said RC circuit, and
   said control means controls said inverter in response to the output of said level discriminator means.

6. An induction heating cooking apparatus in accordance with claim 5, wherein said level discriminator means comprises means for setting two different threshold values to provide the output capable of making said inverter oscillating out of range between these two threshold values.

7. An induction heating cooking apparatus in accordance with claim 1, which further comprises a second power supply being installed in said connector for energizing at least said thermo-sensitive device and said light emitting device.

8. An induction heating cooking apparatus in accordance with claim 7, wherein said second power supply comprises a battery.

9. An induction heating cooking apparatus in accordance with claim 8, which further comprises manually operable power switch means inserted between said battery and said thermo-sensitive device and said light emitting device.

10. A induction heating cooking apparatus in accordance with claim 1, which further comprises positioning means being installed at a side of said cooker main unit for positioning said connector to a predetermined position.

11. An induction heating cooking apparatus in accordance with claim 10, wherein said positioning means comprises a stepwise portion formed in association with the position of said light transmitting part.

12. An induction heating cooking apparatus in accordance with claim 10, wherein said positioning means comprises:
a magnet installed in said connector, and
a magnetic member installed at a side of said cooker main unit so as to respond to said magnet for positioning said connector.

13. An induction heating cooking apparatus in accordance with claim 12, wherein said magnetic member comprises another magnet.

14. An induction heating cooking apparatus in accordance with claim 12, wherein said magnetic member comprises a ferromagnetic metal plate.

15. An induction heating cooking apparatus in accordance with claim 1, which further comprises cut-off means for cutting off an extraneous light impinging on said light receiving device from said light transmitting part in a state wherein said connector is removed from said cooker main unit.

16. An induction heating cooking apparatus in accordance with claim 15, wherein said cut-off means comprises;
a magnet installed in said connector, and
a moving member being capable of moving in response to said magnet for leading a light signal from said light transmitting part to said light receiving device in a state wherein said connector is attached to said cooker main unit and cutting off said light signal in a state wherein said connector is removed from said cooker main unit.

17. An induction heating cooking apparatus in accordance with claim 1, which further comprises temperature setting means installed in said connector.

18. An induction heating cooking apparatus in accordance with claim 17, wherein said thermo-sensitive device comprises a temperature dependent resistance device changing the resistance value thereof in response to the temperature, and
said temperature setting means comprises a variable resistance device cooperating with said temperature dependent resistance device.

* * * * *